(No Model.)
U. B. HIRD.
CURRY COMB.
No. 381,550. Patented Apr. 24, 1888.
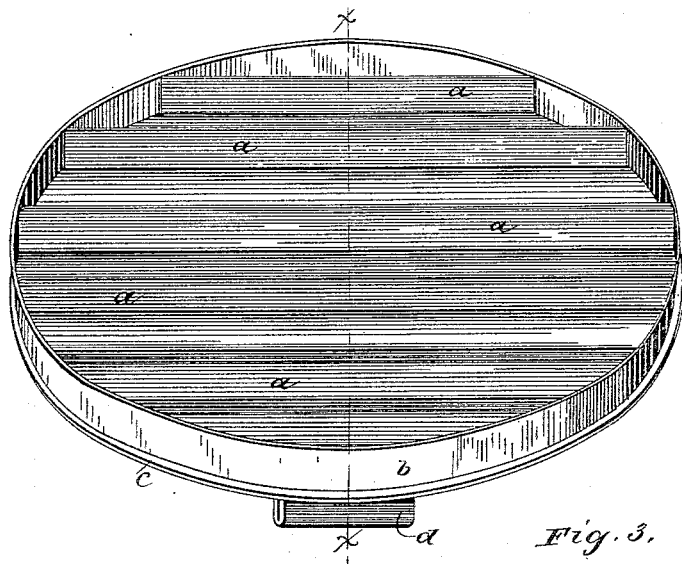
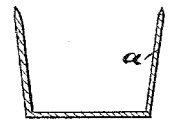
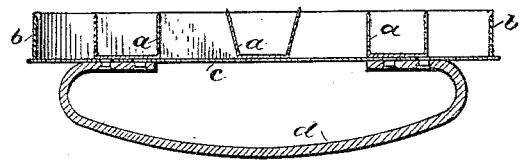
Witnesses.
Inventor,
Urbane B. Hird,
by H. J. Fisher,
Attorney.
N. PETERS, Photo-Lithographer, Washington, D. C.

UNITED STATES PATENT OFFICE.

URBANE B. HIRD, OF CLEVELAND, OHIO.

CURRY-COMB.

SPECIFICATION forming part of Letters Patent No. 381,550, dated April 24, 1888.

Application filed June 18, 1887. Serial No. 241,726. (No model.)

*To all whom it may concern:*

Be it known that I, URBANE B. HIRD, a citizen of the United States, residing at Cleveland, in the county of Cuyahoga and State of Ohio, have invented certain new and useful Improvements in Curry-Combs; and I do hereby declare that the following is a full, clear, and exact description of the invention, which will enable others skilled in the art to which it appertains to make and use the same.

My invention relates to improvements in curry-combs; and it consists in a device for cleaning animals, having a series of smooth sharp-edged blades or scrapers arranged substantially in parallel lines on a suitable back, and preferably with a rim of like material and character extending around the ends of the blades and inclosing the same so as to avoid sharp corners, which might cut or injure the animal.

In the accompanying drawings, Figure 1 is a perspective of the improved cleaning device or comb, showing the arrangement of the blades and the bands surrounding them. Fig. 2 is a cross-section on line *x x*, Fig. 1. Fig. 3 is a cross-section of one of the blades on an enlarged scale, showing the bevel along the edge thereof more distinctly.

The distinguishing feature of this implement is its sharpened edge. I am aware that it is not new to employ a perfectly smooth-edged currying or scraping device for cleaning horses and cows, and such I do not broadly regard as my invention; but I am not aware that any one has ever before used a cleaner or scraper for such animals which has a decidedly sharpened smooth edge. I have found that by combining a series of such blades as are here shown in parallel lines a short distance apart I cannot only use them with perfect safety to the animal, so far as bodily injury is concerned, but it makes a device of unexampled utility and efficiency in cleaning a horse. I have found it especially advantageous in the spring, when horses are shedding their heavy winter coats, the sharp edges laying hold of the hair with just sufficient severity to carry it off, instead of merely passing over it, as is the case when the scrapers are smooth-edged, but not sharpened. It is however admirably adapted to general stable use at all seasons of the year, and gives the most satisfactory results in removing dust, dirt, and the like from the animal with comparatively little labor.

The device, as here shown, is made of sheet-tin, although any suitable sheet metal or other light metal may be used. The blades or scrapers are represented by *a*, which should be set substantially in parallel lines, although some variation from this arrangement may be made, if preferred.

In Fig. 2, I show a form of comb in which the active work is done by the two central blades set at an inclination outward from the center, and the sharp-edged band. The special merit of my comb is that it lays hold of the hair; hence the construction shown in this figure, which illustrates a comb having a blade set each way from the center, so that as the comb is moved back and forth transversely to the lay of the hair, as up and down on the side of a horse, there will be only one blade prominent to do the work, and this blade sharp, so as to engage the hair. The inclination of the blade helps to make the engagement. In that case the band and the other inclined blades act in a sense as guards for the active blades, though the band, being sharp, will do some execution. When this form of comb is used, the intermediate blades form chambers which collect the dust and hair. This construction is especially adapted to clean horses that are shedding, as in the spring of the year, and the other style of comb at other times.

As seen in Fig. 3, the blades are beveled to a practically sharp edge, and when they become dull should be sharpened again, which can readily be done with a file or other sufficient means. The sharp edge makes the blades lay hold of the hair, and gives penetration and thoroughness to the device, while the multiplicity and proximity of the blades with the band or rim *b*, which incloses their ends and encircles the entire comb, renders the device harmless so far as injury to the animal may be concerned. These blades are soldered or otherwise attached to the back *c*. The back may be either rigid or flexible and open or closed. I however prefer a rigid closed back, and affix thereto a handle, *d*, which enables me to hold and work the comb in the most satisfactory way.

Having thus described my invention, what I claim, and desire to secure by Letters Patent, is—

1. A curry-comb having a series of metallic blades with smooth cutting-edges and a band extending around the comb and inclosing the ends of the blades, said band having a smooth cutting-edge like the blades, substantially as set forth.

2. A curry-comb provided with a series of parallel metallic blades secured to a close back, the two central blades inclined outward from the center in opposite directions and raised above the blades on either side, said blades having smooth sharp cutting-edges and a sharp edged band encircling the comb and forming guards and supports for the ends of the blades, substantially as set forth.

URBANE B. HIRD.

Witnesses:
H. T. FISHER,
J. E. RUNDLE.